April 10, 1951 C. B. H. FELDMAN 2,548,661

ELASTIC TIME DIVISION MULTIPLEX SYSTEM

Filed Feb. 10, 1949 5 Sheets-Sheet 1

INVENTOR
C. B. H. FELDMAN
BY Harry C. Hart
ATTORNEY

ELASTIC TIME DIVISION MULTIPLEX SYSTEM

Filed Feb. 10, 1949 5 Sheets-Sheet 2

INVENTOR
C.B.H. FELDMAN
BY Harry C. Hart
ATTORNEY

April 10, 1951 C. B. H. FELDMAN 2,548,661

ELASTIC TIME DIVISION MULTIPLEX SYSTEM

Filed Feb. 10, 1949 5 Sheets-Sheet 3

INVENTOR
C. B. H. FELDMAN
BY Harry C. Hart
ATTORNEY

April 10, 1951 C. B. H. FELDMAN 2,548,661

ELASTIC TIME DIVISION MULTIPLEX SYSTEM

Filed Feb. 10, 1949 5 Sheets-Sheet 4

INVENTOR
C. B. H. FELDMAN
BY Harry C. Hart
ATTORNEY

April 10, 1951 C. B. H. FELDMAN 2,548,661

ELASTIC TIME DIVISION MULTIPLEX SYSTEM

Filed Feb. 10, 1949 5 Sheets-Sheet 5

INVENTOR
C.B.H. FELDMAN
BY Harry C. Hart
ATTORNEY

Patented Apr. 10, 1951 2,548,661

UNITED STATES PATENT OFFICE 2,548,661

ELASTIC TIME DIVISION MULTIPLEX SYSTEM

Carl B. H. Feldman, Summit, N. J., assignor to Bell Telephone Laboratories, Incorporated, New York, N. Y., a corporation of New York Application February 10, 1949, Serial No. 75,628

8 Claims. (Cl. 179—15)

This invention relates to multiplex communication, and more particularly to the transmission of telephone calls on a time division multiplex basis.

The principal object of the invention is to provide for the handling of calls originating with a number of independent subscribers by a lesser number of channel facilities, thus reducing the fraction of the time during which a transmission channel would otherwise be idle, and so enabling economies to be effected in the provision of transmission channel facilities.

A more specific object is to provide for the handling of the simultaneously active few of a number of independent and potentially active callers on a time assignment basis.

Another object is to interpolate the speech of talkers of lower urgency ratings in the pauses between spurts of speech of talkers having higher urgency ratings.

These and other objects are attained, in accordance with the invention, by the provision of a sequence of channel pulses whose locations on the time scale are not fixed, but variable as a function of the distribution of activity among the several talkers. When a particular talker is for the moment active, the channel pulse assigned to him is given a "busy" character which introduces a time delay before the accurrence of the next channel pulse in order; and in the interval thus provided, the instantaneous amplitude of that talker's speech is translated into a permutation code group of pulses, and so transmitted. The same sequence of events takes place for each active talker in turn, until the available channels have been filled. When, however, any one of the talkers is instantaneously silent, his channel pulse is given an "idle" character, the corresponding zero amplitude code pulse group is suppressed, and the time interval which would otherwise be assigned to it is skipped. This "idle" channel pulse is immediately followed by a channel pulse for the next talker in order, and so on, each "idle" channel pulse being immediately followed by another channel pulse, each "busy" channel pulse being followed by a permutation code pulse group which is in turn followed by the next channel pulse. At the receiver terminal, the character of each channel pulse, "busy" or "idle" as the case may be, sets in operation apparatus which either decodes the ensuing group of permutation code pulses or skips the time interval in which the permutation code pulses representing the zero speech amplitude of the silent talker would otherwise occur.

Among the features of the invention are the apparatus which introduces the time delay between the channel pulse of each talker and of the next one in order, which is required, when the former is active, to provide time for the coding of his speech sample. In a preferred arrangement, a plurality of similar impulse coils are provided one for each talker, each with its saturable ferromagnetic core. They are supplied with current of sawtooth wave form by way of static time delay circuits so that the magnetic condition under which the pulse arises occurs for the several coils in time sequence, each being delayed with respect to its neighbor of lower number by a single pulse period. In addition, each coil is provided with a control bias winding, and these are connected in series. Activity of any talker gives rise to a current of standard magnitude which flows through the control bias windings of all of the coils having higher numbers. The magnetizing force of this current opposes that of the sawtooth current, and so serves in effect to delay the pulsing instants of all such coils having higher numbers by a time sufficient to permit the interpolation of a permutation code group of pulses corresponding to the speech amplitude sample of the active talker. The process is repeated for each active talker in turn until the time of the transmission cycle has been fully utilized. Talkers who happen to be active at this instant are skipped, and must await their turn in the following operation cycle. Such a situation rarely occurs when the system is properly designed in respect to number of talkers and number of channel facilities. Similar impulse coils, provided with similar bias windings similarly energized, are provided for the allotment of appropriate time intervals to the decoding of incoming signals of the active talkers, while economizing the corresponding times in the case of inactive talkers.

Because of the manner in which the transmission channels are shifted on the time scale in accordance with the activity distribution among the talkers, the present system may be termed an "elastic" time division multiplex system.

The invention will be fully apprehended from the following detailed description of an embodiment which, for illustrative purposes, is taken as a system for transmitting the telephone calls originating with eight potential talkers and destined for eight listeners. Of these eight potential talkers, the speech of any three instantaneously active talkers is transmitted on a time division basis. Again for purposes of illustration, speech amplitudes are transmitted in the form of six-digit binary code pulse groups. Each such code pulse group is preceded by a "busy" channel pulse and is followed by a blank pulse position which is provided to allow the coding apparatus to recover and be in readiness for the next coding operation. Thus each operation cycle or frame period is made up as follows:

| | |
|---|---|
| Channel pulse periods | 8 |
| 3 code pulse groups, six digits | 18 |
| 3 coder recovery periods | 3 |
| 1 frame synchronizing pulse | 1 |
| Pulse periods per frame | 30 |

The exemplary embodiment to be described is illustrated in the accompanying drawings, in which.

Figure 1:
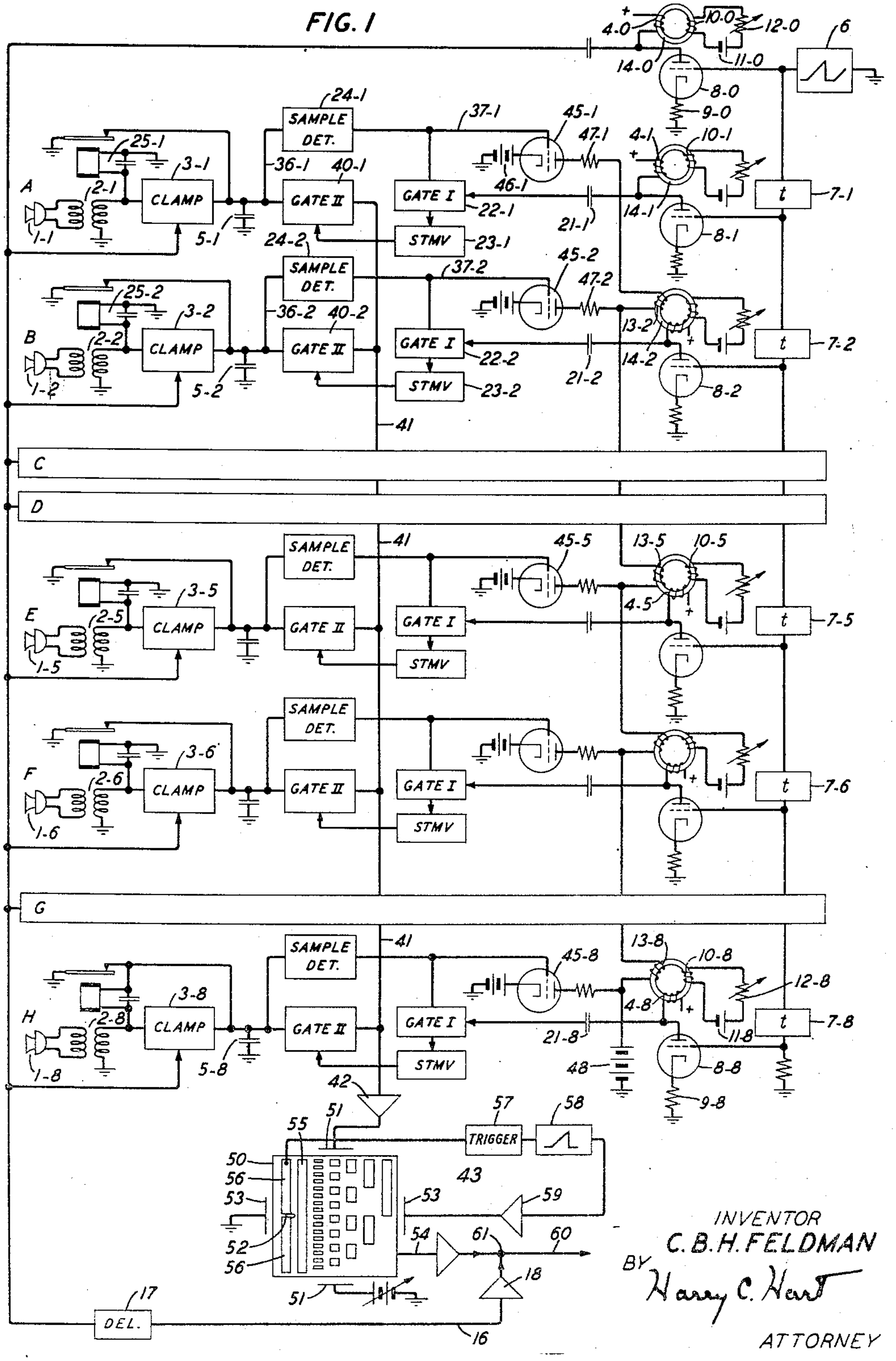
Fig. 1 is a schematic diagram, partly in block form, of elastic time division multiplex transmitter terminal apparatus.

Referring now to the drawings, and in particular to Fig. 1, several talkers A to H, inclusive, actuate an equal number of telephone transmitters 1—1 to 1—8 at will and at random. Each of these transmitter instruments, when so actuated, furnishes speech energy by way of a transformer 2—1 to 2—8 to a sampling clamp 3—1 to 3—8. These clamps are all operated simultaneously, once in each time division cycle or frame period, by application of the pulse output of coil 4—0 to its control terminal designated by an arrow. When so actuated, these clamps serve to place on the storage condensers 5—1 to 5—8 electric charges which are proportional to the instantaneous amplitudes of the speech waves of the respective talkers.

Figure 2A:
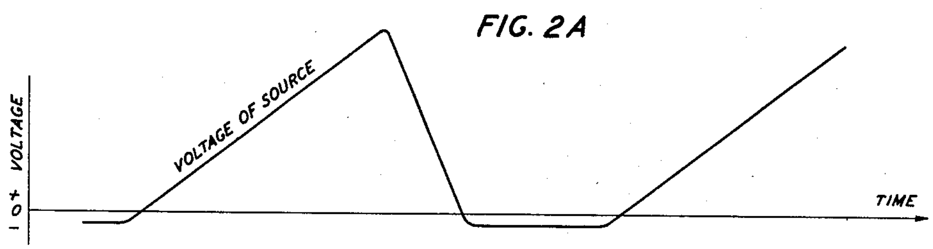
Figs. 2A, 2B and 2C show a group of wave form diagrams of assistance in explaining the operations of the apparatus of Fig. 1.
Figure 2B:
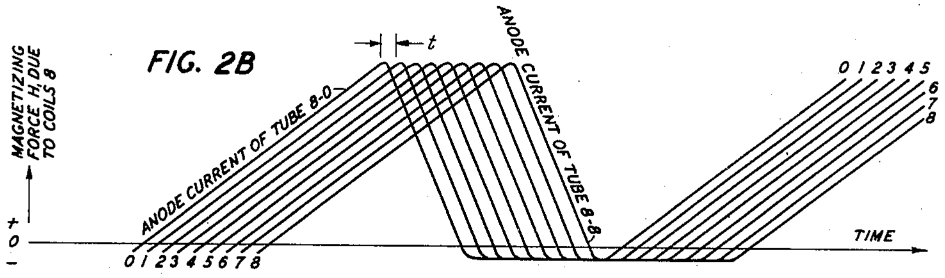

The sequence of events required for operation of the whole system is controlled by recurring sawtooth current waves. These current waves may be generated in any desired fashion but a convenient one comprises the application of a sawtooth voltage wave, of the form shown in Fig. 2A, derived from a timing generator 6 to progressive phasing apparatus. The latter may comprise a tandem-connected sequence of delay devices 7—1 to 7—8, contributing individual delays of a single pulse period $t$ or a total delay of $8t$ from end to end. A tapping point is provided at the output terminal of each of these devices. As is well known, when the sawtooth wave form voltage of the timing source 6 is applied to this sequence of delay devices, delayed versions of it appear at the various tapping points. Design of the individual delay devices in well-known manner enables the delay between the voltages appearing at successive tapping points to be adjusted with precision to one pulse period. These various tapping point voltages are applied to the control grids of a like number of tubes, for example triodes 8—0 to 8—8 each of which has a resistor 9—0 to 9—8 of high ohmic value connected in its cathode circuit to provide substantial negative feedback. As is well known, these connections result in the cathode voltage and the anode current following the applied control grid voltage, so that the anode currents of the several tubes have substantially the same sawtooth wave form as the voltage of the source 6, each being delayed with respect to the anode current of the tube above it by the delay contributed by one of the delay devices 7. These wave forms are shown in Fig. 2B.

In the anode circuit of each of these tubes 8, there is connected an impulse coil 4. A second direct-current bias winding 10 is wound on the same core 14 as the impulse coil 4 and carries a fixed bias current derived from a battery 11 and adjustable in magnitude by a variable resistance 12. A third winding 13—2 to 13—8 is wound on the same core 14 in the case of all of the triodes except the first two. These third windings serve as control bias windings, each one carrying a variable bias current which depends on the distribution of activity among the several talkers in the manner to be described below. These third control bias windings 13 are all connected in series and by way of a battery to ground.

Figure 2C:
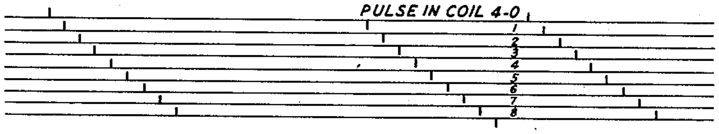

Disregarding, for the present, the action of the third winding 13, the currents in the individual direct-current bias windings 10 are so adjusted that, when the discharge currents of the triodes 8 have their minimum values, i. e., at instants corresponding to the most negative part of the sawtooth voltage wave of the source 6, the net magnetizing force in each case, due to the combined action of the impulse winding 4 and the bias winding 10 and the currents flowing in them is slightly negative with respect to the value at which the permeability of the core rises sharply. This is illustrated by the lower portions of the variously delayed sawtooth waves of magnetizing force of Fig. 2.

Now when the current in the impulse winding of coil 4—0 commences to rise, the magnetizing force on the core due to this current balances the magnetizing force due to the current in the bias winding 10—0 so that the net magnetizing force on the core is just sufficient to bring the magnetic condition into the high permeability region. At this instant a pulse (Fig. 2C) occurs at the output terminals of the first winding 4—0 and this pulse is applied by way of the conductor 15 to all of the two-way clamps 3 simultaneously. It serves to clamp the instantaneous speech amplitudes of the several talkers A to H, inclusive, onto the several storage condensers 5—1 to 5—8, inclusive, and so to store samples of their speech for future use. This same pulse is also delivered by way of a conductor 16 to the output terminals of the transmitter apparatus for transmission to a receiver station where it serves to establish synchronism between the events taking place there and those taking place at the transmitter. A delay device 17 and an amplifier 18 are interposed in this path, the first to balance miscellaneous delays originating in other components of the transmitter apparatus the second to increase the amplitude of this pulse as compared with message code pulses, so that it may be sorted, at the receiver, on an amplitude basis.

After a time interval equal to a single pulse period, hereinafter designated $t$ and determined by the design of the delay device 7—1, a delayed version (curve 1 of Fig. 2B) of the sawtooth current wave flows through the impulse winding of the second coil 4—1 and by actions identical to those discussed above, a pulse appears at the output terminal of this impulse winding which is delayed by the time $t$ with respect to the coil 4—0 pulse. Similarly with respect to the remaining coils of the groups 4—0 to 4—8; in the absence of current in the third windings 13 of the several coils, the output terminals of the several impulse windings deliver pulses in regular time succession.

After the completion of the rise of current in each impulse winding, it commences to fall. In the course of this fall, the magnetizing forces in the several cores pass through the pulsing values and output pulses will again occur in sequence. However, these pulses are of opposite polarity and have no effect on the system. Such a negative pulse is shown for each of the coils 4 in the lower part of Fig. 2.

After the completion of the fall of current in the last coil 4—8, the cycle of operations is repeated.

Coming now to the elastic feature of the system, which involves effectively delaying all of the channel pulses for channels following an active talker, the following description explains the operating principle.

When the coil 4—1 pulse occurs it is applied by way of a blocking condenser 21—1 to a coincidence gate I 22—1 which operates a single trip multivibrator 23—1 provided it is "enabled" by the existence of a standard voltage which signifies activity of talker A, and not otherwise. The gate I 22—1 may comprise, for example a pentode, to whose suppressor gate one input is applied, while the other input is applied to its control grid. This enabling voltage may be derived from any suitable speech sample detector 24—1 which may be an electronic relay which responds by delivering a voltage of standard magnitude and sign when the speech sample stored on the storage condenser 5—1 has a value other than zero, thus signifying that talker A is presently active. By a value other than zero is meant a value equal to or greater than the smallest speech amplitude to be recognized as such and transmitted in code. Since this smallest speech amplitude which it is desirable to transmit may be smaller than the amplitude of noise of low audibility (such as low frequency hum present in the talker's line) it may be desirable to supplement the sample detector 24—1 which operates on each speech sample, with a speech detector 25—1, tuned to speech frequencies and having the ability, by frequency selection, to distinguish between continuous speech and these noises of low audibility. The relay of the speech detector connects the storage condenser 5—1 to ground during the pauses between spurts of speech and insures that noise will not be mistaken for genuine talker activity. If talker A is inactive, the output of the sample detector 24—1 remains zero and the coincidence gate 22—1 remains disabled, independent of the presence of noise. In this pulse period, following the synchronizing pulse, no pulse is transmitted to the receiver if talker A is inactive.

Figure 3:
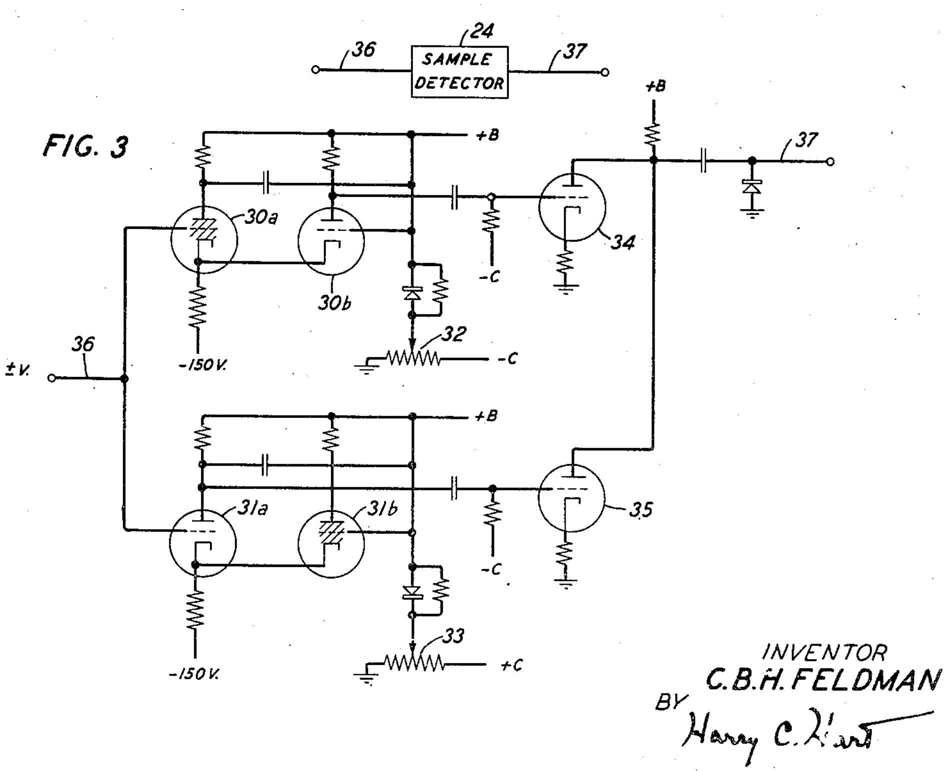
Fig. 3 is a schematic diagram of a speech sample detector which may be employed in the apparatus of Fig. 1.

The speech sample detector may comprise a pair of "slicer" circuits connected back to back and provision for inverting the output of one of them. Fig. 3 shows a suitable circuit arrangement in which each of the slicers comprises a two-tube multivibrator, the grid of the right-hand tube 30—*b*, 31—*b*, being supplied with an adjustable bias potential, for example by way of a potentiometer connected between ground and a suitable steady potential, negative (−C) or positive (+C) as the case may be. Thus the bias on the grid of the right-hand tube 30—*b* of the upper multivibrator may be adjusted by a potentiometer 32 to a negative value such that, in the absence of input signals, the stable condition of this multivibrator is that in which the left-hand tube is conducting and the right-hand tube is non-conducting, while in the case of the lower multivibrator a positive bias voltage is applied, by way of the potentiometer 33, to the grid of the right-hand tube 31—*b*, so that in the absence of the signal ±V, the right-hand tube is conducting while the left-hand tube is non-conducting. The output is taken from the normally non-conducting tube in each case, i. e., from the anode of the right-hand tube 30—*b* of the upper multivibrator and from the anode of the left-hand tube 31—*a* of the lower multivibrator. These outputs are individually applied to the control grids of buffer amplifiers 34, 35 whose anodes are connected together. With this network, when a positive voltage is applied to the input terminal 36, it has no effect on the upper multivibrator, but if it exceeds the preassigned threshold set by the tap on the potentiometer 33, it causes the left-hand tube 31—*a* of the lower multivibrator to conduct, the right-hand tube 31—*b* becoming non-conductive. This applies a negative voltage increment to the grid of a lower buffer tube 35 and cuts this tube off, thus causing a positive voltage of standard magnitude to appear at the output terminal 37. Similarly, when a negative speech voltage is applied to the input terminal 36 of the device, it has no effect on the lower multivibrator, but when it exceeds a preassigned threshold determined by the setting of the upper potentiometer 32, it causes the left-hand tube 30—*a* of the upper multivibrator to be rendered non-conductive, and the right-hand tube 30—*b* to conduct. This applies a negative voltage increment to the grid of the upper buffer tube 34 and cuts it off, thus applying a positive voltage of standard magnitude to the output terminal 37 of the device.

In the case of each of the multivibrators, the grid to which the control bias is applied is also supplied with a bias-equalizing network which may comprise a diode shunted by a high resistor. This serves to make the grid bias of the right-hand tube of each of the multivibrators substantially independent of signal frequency conditions.

By adjustment of the magnitude of the inter-tube coupling condensers in each of the multivibrators and of their associated resistors, their time constants are preferably made much longer than the period of the lower speech frequency. The time constants of the alternating current coupling to tubes 34 and 35 as well as the time constants of the alternating current coupling to the wire 37 must be long in comparison to the duration of a talkspurt. Thus the speech sample detector 24 having recognized the presence of a voltage, positive or negative, in excess of the preassigned threshold, applies an enabling voltage to the other components of the system as hereinabove described and holds it for a time of such duration as to enable these other components to perform their assigned operations, whereupon it relaxes and returns to its original condition in preparation for the receipt of a new value of the speech voltage.

The sequence of events throughout a frame will be described in connection with an example, depicted in the curves of Fig. 4, in which talkers B, E and F are active, the others being inactive.

The next event to occur, inasmuch as talker A has been described as being inactive so that his coincidence gate I 22—1 and his single trip multivibrator 23—1 are not enabled, is the pulse of coil 4—2, which occurs in the next pulse period following the pulse of coil 4—1. It is applied to the second coincidence gate I 22—2 to which is also applied the output of talker B's speech sample detector 24—2. Under the assumed conditions, talker B is active so that the relay of his tuned speech detector 25—2 is opened and the output of his speech sample detector 24—2 has its standard enabling value and the coincidence of this output with the pulse of coil 4—2 serve to enable the gate I 22—2 and so to operate the single trip multivibrator 23—2 which then delivers a flat topped pulse to a gate II 40—2. This gate may, like the one described above, comprise a pentode, to the control grid of which the voltage of the storage condenser 5—2 is applied while the output of the single trip multivibrator 23—2 is applied to its suppressor grid. As is well known, with such a circuit, the charge on the storage condenser 5—2 is effectively gated to an output conductor 41 when and only when the gate 40—2 is "opened" by the output of the single trip multivibrator 23—2. The speech sample of talker B is thus applied to an amplifier 42 and then to a coding device 43 for as long a time as the output pulse of the single trip multivibrator 23—2 continues. This time is adjusted to be $7t$ as shown in curves E of Fig. 4.

In order to allow time for the production and transmission of the code pulse group representing the speech sample of talker B, the pulses of talkers C through H, inclusive, are now all delayed by seven pulse periods in the following manner. The output of talker B's speech sample detector 24—2 is applied to the grid of a triode 45—2 which is normally held below cut-off by a bias battery 46—2. The output of the speech sample detector 24—2 raises the grid of this triode 45—2 above cut-off by a standard amount. A standard current then flows through the discharge path of this triode and through the control bias windings of all of the coils 13—3 to 13—8, inclusive, in series. By making the resistance values of the anode resistors 47 of each of the triodes 45 high in comparison with the resistances of the control bias windings 13, it is possible to arrange that the current flowing through these windings by the application of the speech sample detector voltage to the grid of any of the triodes 45 shall be of standard magnitude and independent of the number of coils 13 through which it flows. In the assumed condition, the current flows under the influence of a battery 48 through the discharge path of the triode 45—2, through its anode resistor 47—2 and through the bias windings of coils 13—3 to 13—8, inclusive, whereas had talker A been active, the same current would have flowed through the discharge path of the triode 45—1 and through its anode resistor 47—1 and through coils 13—2 to 13—8, inclusive.

In accordance with the invention, the magnitude of the current thus flowing through these coils is so adjusted as to bias the magnetizing force in all of their cores by an amount such that, in the course of the rise of the voltage wave (Fig. 2) of the saw-tooth generator 6, the pulse condition will not be reached until after a delay of $7t$. This condition is illustrated in curves A of Fig. 4, wherein the pulse from coil 4—3 occurs at the 10th pulse position of the frame instead of at the third pulse position where it is shown in Fig. 2.

Under the assumed conditions, talkers C and D are inactive, so that their speech sample detectors 24—3 and 24—4 record no stored condenser voltages other than 0, their single trip multivibrators 23—3 and 24—4 remain disabled and their tubes 45—3 and 45—4 remain cut off. Thus the zero value speech samples are not applied to the coding device 43 and the pulses derived from the impulse coils 4—3 and 4—4, respectively, take place in rapid succession, spaced only by the pulse period time interval $t$. However, talker E is active, so that when the pulse is generated by the impulse coil 4—5, his speech sample detector 24—5 is delivering an output, and the coincidence gate I 22—5 and the associated single trip multivibrator 23—5 are therefore enabled and the latter opens the gate II 40—5 admitting the voltage of the storage condenser 5—5 to the coder 43. At the same time the output of the speech sample detector 24—5 is applied to the grid of the triode 45—5 so that standard current flows from the battery 48 through the bias windings 13—6 to 13—8. This current is in addition to the current already flowing through coils 13—3 to 13—8, inclusive, and thus further biases the magnetizing force on the cores of these coils by an amount such that the pulse derived from the coil 4—6 is again delayed by another time interval of $7t$. This is illustrated in Fig. 4 where the coil 4—6 pulse occurs in the twentieth pulse position instead of in the sixth where, as shown in Fig. 2, it would have occurred had it not been delayed by fourteen pulse positions, i. e., by a total delay of $7t$, due to activity of talkers B and E. By a sequence of operations similar to that described above, the activity of talker F results in a standard voltage output of his speech detector 24—6 which permits the coil 4—6 pulse to open the gate I 22—6 thus admitting the sample of the talker F's speech to the coder 43 and at the same time providing a third increment of bias current through the tubes 45—7 and 45—8 and the control bias windings of coils 13—7 and 13—8.

The events described above have provided a time interval of $7t$ immediately following the coil 4—2 pulse, another time interval of $7t$ immediately following the coil 4—5 pulse and a third time interval of $7t$ immediately following the coil 4—6 pulse. While the three intervals, of $7t$ each, have been discussed in succession, it will be recalled that they all result from events occurring within the first $t$ period following the sampling pulse of coil 4—0. These time intervals are employed in accordance with the invention for carrying out the operations of coding and transmitting the speech amplitude samples of talkers, B, E and F, respectively, which, by hypothesis were active at the instants at which the several talkers' transmitters were clamped to the storage condensers 5.

The coder 43 may comprise a modification of the one shown and described in two articles published in the Bell System Technical Journal for January, 1948, volume 27, pages 1 and 44. In brief it comprises an electron tube having an electron gun, a target anode and a coding mask 50 interposed in the path of the beam between the gun and the target. The coding mask is provided with perforations or apertures arranged in rows and columns in accordance with the digits of the binary code. For a six-digit code as contemplated in the present illustration, the apertures are arranged in six vertical columns and in sixty-three horizontal rows. To avoid undue detail in the drawing, the mask is shown as arranged for a five-digit code; i. e., with the coding apertures arranged in five vertical columns and thirty-one horizontal rows. One pair of deflecting elements, for example, plates 51 deflect the beam 52 from its rest position on a level with the center of the coding mask to one aperture row or another in accordance with the magnitude of a speech sample to be coded. Another pair of deflecting elements 53 then sweep the beam across all of the apertures of this particular row, giving rise to a sequence of pulses in the output circuit 54 which constitutes a permutation code pulse group in accordance with the six-digit binary code.

In accordance with the present invention, the coding mask is provided with certain additional features. In the first place, there is provided a single large aperture 55 which extends throughout the full length of the mask from its first aperture row to the last and disposed at that side of the mask at which the cathode beam sweep commences. As a result, each time the beam sweeps across the apertures of any row, the code group of output pulses is preceded by a pulse due to passage of the beam through this large aperture 55. This preceding pulse constitutes the channel pulse which serves to indicate to the receiver terminal apparatus that a binary code pulse group is to follow immediately. Second, the sweep of the beam across the various rows of apertures takes place in an aperiodic fashion in dependence on the activity distribution among the several talkers. To this end the coding mask 50 is provided to the left of the channel pulse aperture 55 with two ribbon-like electrodes 56 which, together, extend throughout the full height of the coding mask 50 except for a bare central portion. These two electrodes are connected together and to the input terminals of a trigger circuit 57 whose output pulse operates an aperiodic coding sweep generator 58. The trigger circuit may be of any desired type, a suitable one being a single trip multivibrator connected to be tripped by application of negative pulses. Deflection of the cathode beam 52 upward or downward in either direction away from its central rest position causes it to impinge on the ribbon electrode 56 and deliver a negative voltage to the trigger circuit 57 whose output sets off the aperiodic sweep generator 58. The latter may comprise a resistor, a condenser, a source of voltage and a discharge tube interconnected in well-known fashion to charge the condenser relatively slowly to a preassigned voltage and then discharge it rapidly. As is well known, by suitable choice of the magnitudes of the condenser and the resistor, the condenser voltage may be caused to rise substantially linearly with time for a certain fraction of its charging cycle. This linearly rising voltage is now applied to an amplifier 59 which feeds the horizontal deflecting plates 53 of the coding tube and so causes the cathode beam 52 to sweep first across the channel pulse aperture 55 and then across the following code pulse apertures of a particular row. The sensitivity of the amplifier 59 is so adjusted that the sweep across the coding apertures is completed after a period of $7t$, that is seven pulse periods, the first being that associated with the channel pulse and the remaining six with the code pulse group. Thereafter the sweep is returned to its initial position by self-restoration of the multivibrator 58 to its original quiescent condition. As appears in curves C of Fig. 3, a time interval $t$ following the six-digit code is allowed for recovery prior to the next coding operation. The sweep and recovery are shown in curves F of Fig. 4.

In the course of its sweep across the apertures of the coding mask 50, the beam may be stabilized aginst wander and so restricted to movement along a particular aperture row by the use of a stabilizing grid as described in the aforementioned article published in the Bell System Technical Journal and as claimed in an application of L. A. Meacham, Serial No. 766,211, filed August 5, 1947, and issued on June 21, 1949, as Patent 2,473,691. Throughout the horizontal or lateral sweep of the beam across the apertures of a particular row, the beam has been localized on the correct row by being deflected thereto by the application of the signal sample voltage being coded. In particular, and in the case assumed, the first signal sample of the frame to be coded is that of talker B which has been stored on the storage condenser 5—2 and admitted to the vertical deflecting plates of the coding tube by way of gate II 40—2. At the termination of the coding tube beam sweep, the beam is restored to its rest position as above described by return of the single trip multivibrator 58 of the triggered coding sweep circuit to its original quiescent condition and at the same time the signal sample of talker B is removed from the vertical deflecting plates by the closing of gate II 40—2. This gate is closed by the fact that the single trip multivibrator 23—2, which originally opened this gate upon the occurrence of the pulse in coil 4—2 likewise returned to its original condition after the lapse of seven pulse periods, as indicated in curves E of Fig. 4. Thus the beam, after completion of the coding of the first signal sample, returns to its rest position in the slot between the two ribbon-like electrodes 56. Therefore it remains for two pulse periods, during which the pulses of coils 4—3 and 4—4 occur but fail to enable the single trip multivibrators 23—3 and 24—4 because, by hypothesis, the speech sample detectors 24—3 and 24—4 associated with talkers C and D give no output. Upon the occurrence of the pulse in coil 4—5, gate I 22—5 is opened, admitting to the vertical deflection amplifier 42 of the coding tube a voltage proportional to talker E's speech sample which is stored on condenser 5—5. As above described, the pulse of coil 4—6 is delayed for seven pulse periods, allowing time for the coding of the speech sample of talker E. As described above in connection with talker B, the initial vertical deflection of the cathode beam 52 from its rest position in the slot between the two ribbon-like electrodes 56 in either direction causes the multivibrator 58 to be tripped, the sweep condenser to be charged and the beam 52 to be swept laterally across the apertures of the coding mask 50 giving rise in the output circuit of the coding device to a channel pulse due to passage of the beam through the left-hand channel pulse aperture, immediately followed by a binary code pulse group representative of talker E's signal sample amplitude. The beam then returns to its initial position whereupon the events are repeated with respect to the talker F, being initiated by the occurrence of the initiating pulse in coil 4—6.

After completion of the coding of the speech sample of the talker F, pulses occur in coils 4—7 and 4—8 in rapid succession but they are of no effect because talkers G and H are inactive so that their speech sample detectors 24—7 and 24—8 give no output to complete the enablement of their single trip multi-vibrators 23—7 and 23—8.

As a result of the events described above there has been created on an output conductor 54 a sequence of pulses of which each group comprises a channel pulse followed by a binary code six-pulse group and one recovery period, in the case of active talkers, while for inactive talkers only blank channel pulse positions are created.

At the conclusion of the events described above the pulse of coil 4—0 recurs and a new and different distribution of channel activity may be encountered. The magnetizing force in some of the coils 4—2 to 4—8 may be restored to the condition shown in Fig. 2, having been in the condition shown in A of Fig. 4. If the magnetizing force in some of the coils which had been displaced negatively in the preceding frame crosses zero (becomes positive) when the pulse of coil 4—0 occurs, premature positive pulses will appear in the corresponding coil 4 winding and will produce unwanted events at variance with the principles as described. A preferred way of insuring that this does not occur is to design all of the sweeps to be negative at the time of occurrence of the coil 4—0 pulse as shown in Fig. 2. This requires that the flat portion shown on the negative side of zero in Fig. 2 must persist for at least 8 pulse periods as shown.

In order to understand the principles underlying the design of the sweeps of Fig. 2, it will be desirable to generalize the specific case described in the foregoing, as follows:

Let N stand for the total number of potential talkers, $n$ for the number of active talkers or code pulse groups provided for, and $d$ for the number of digits in the code. Then, in a system embodying the principles described above, each pulse period is made up, in general, and in the specific numerical example employed to illustrate it, as follows:

| | General | Specific |
|---|---|---|
| N channel pulse periods | N | 8 |
| $n$ code pulse groups of $d$ digits | $nd$ | 3×6=18 |
| $n$ recovery periods | $n$ | 3 |
| 1 frame synchronizing pulse | 1 | 1 |
| Total | $N+n+nd+1$ | 30 |

The linearly rising portion of the sweep must be long enough to permit being biased by as many as $(n-1)$ control currents, each delaying the coil 4 pulses by $(d+1)$ periods. The extent of the linearly rising portion must therefore be $(n-1)(d+1)$, or $n+nd-d-1$, pulse periods. Since, as above stated, the flat portion must be at least N periods long, there remain, therefore, at most, $d+2$ pulse periods for the falling part of the curve, during which the transition from the linearly rising part to the flat part may take place.

Figure 4:
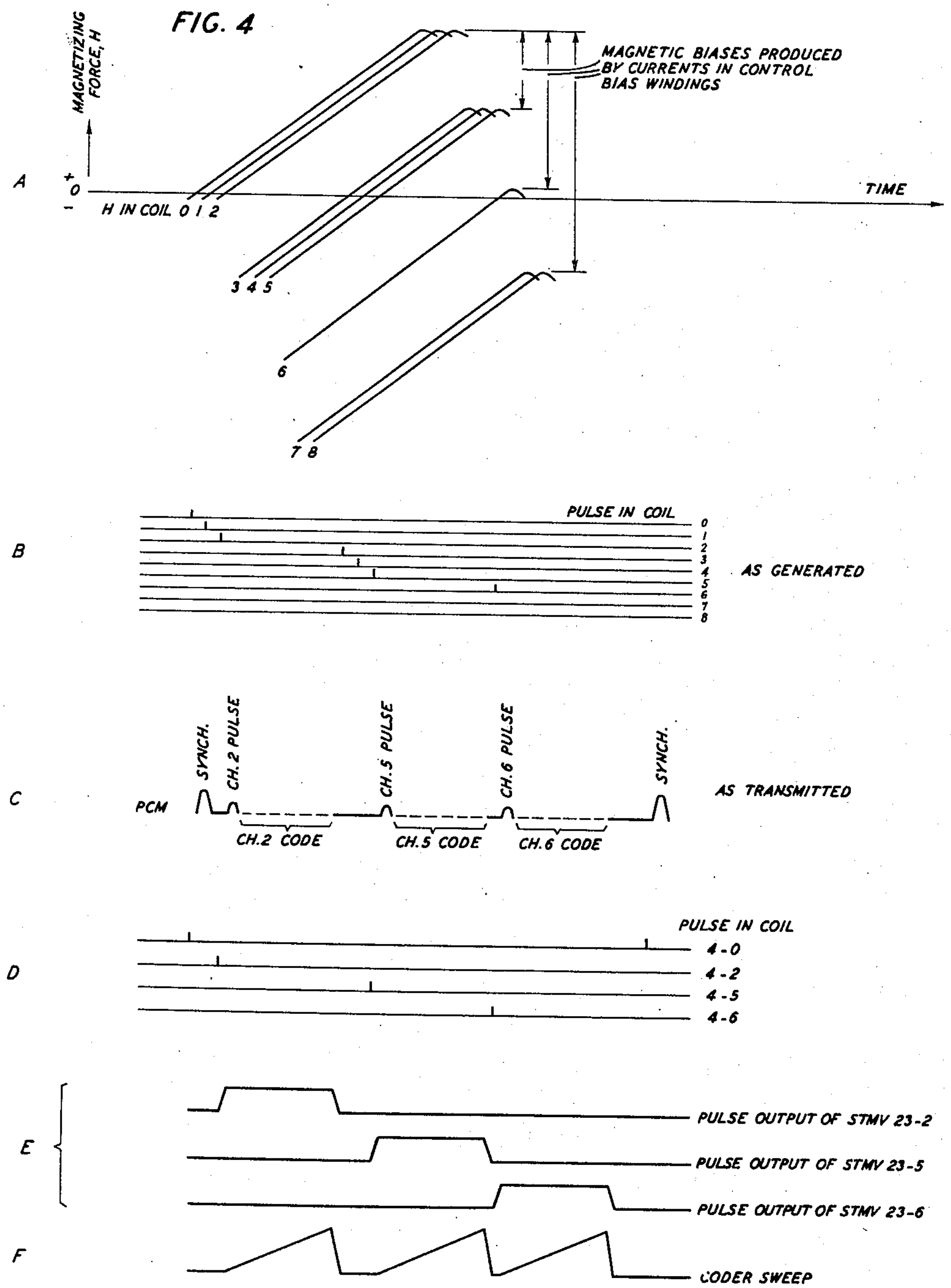
Fig. 4 shows additional wave form diagrams of assistance in explaining the operations of the apparatus of Fig. 1.

Any suitable synchronizing means may be employed in connection with the invention, a suitable one being to apply to the outgoing line 60 at the point shown 61 the pulse voltage of coil 4—0 itself, which may be delayed, if desired, as by a delay device 17 by the interval such as to compensate for delays introduced in the coding operation and locate it in the zero pulse position of the frame as shown in Fig. 4. A suitable characteristic may be given to this synchronizing pulse to enable the receiver terminal equipment to distinguish it from other pulses in the train. For example, it may be of greater amplitude as indicated on the figure.

Figure 5:
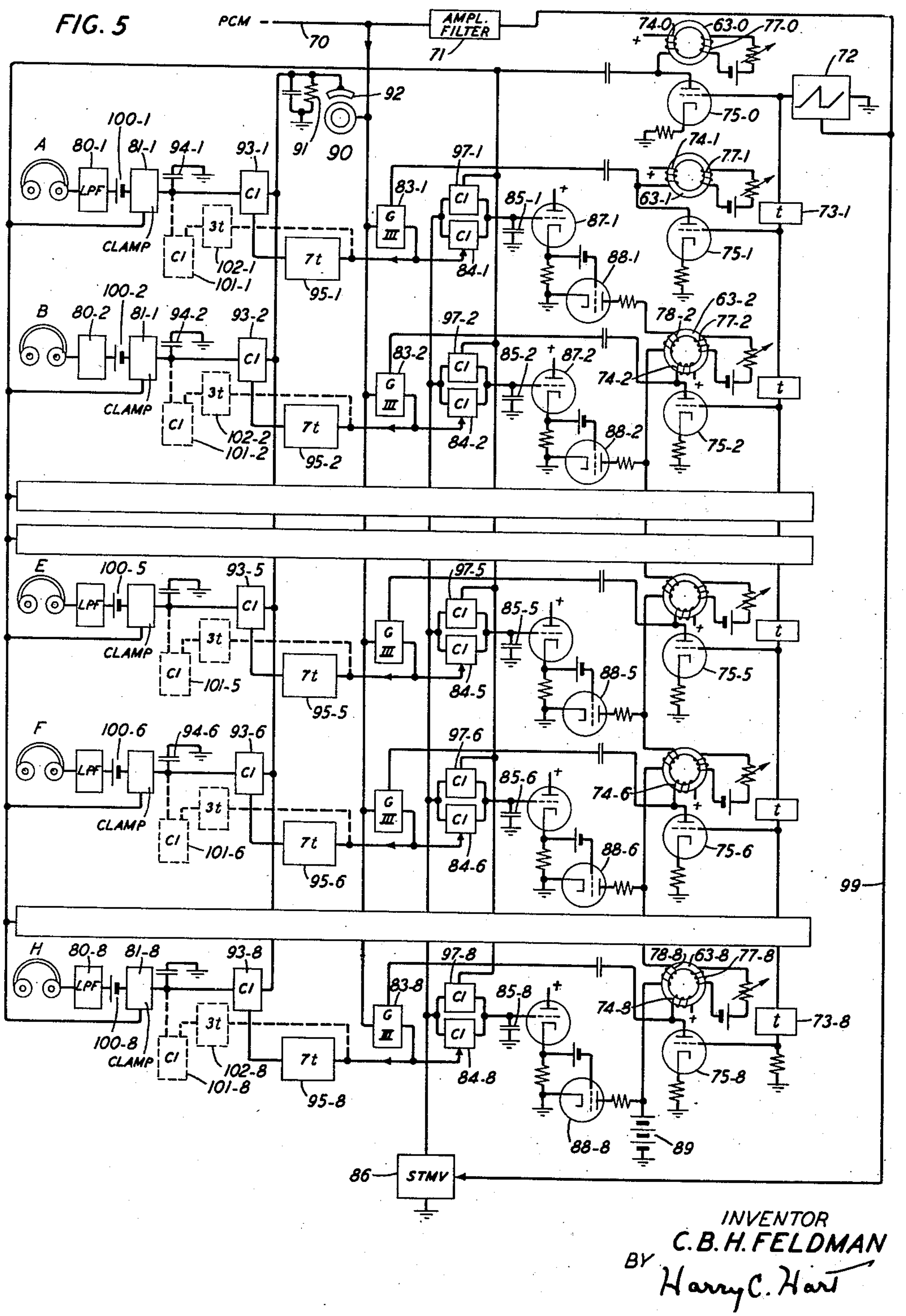
Fig. 5 is a schematic diagram, partly in block form, of elastic time division multiplex receiver terminal apparatus.
Figure 6:
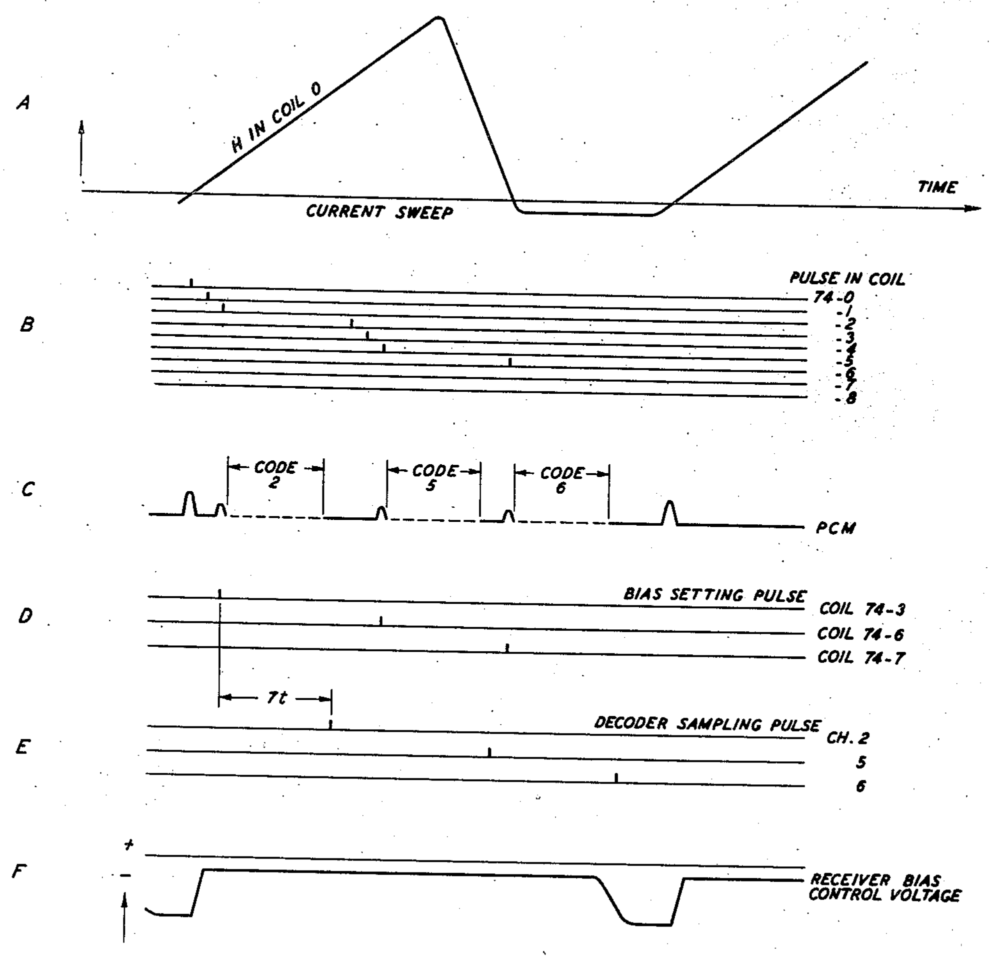
Fig. 6 shows groups of wave form diagrams of assistance in explaining the operation of the apparatus of Fig. 5.

At the receiver terminal, shown in Fig. 5, the incoming pulse train may be conceived of as arriving on an incoming line 70. After such amplification and regeneration as may be considered desirable, this pulse train is applied to the system. The synchronizing pulse may be sorted from the other pulses of the train in a manner appropriate to its distinguishing characteristics. If, as above suggested, it differs merely in amplitude, it may be applied by way of an amplitude filter 71 to control the timing of a basic timing generator in well-know fashion. Aside from the fact that it is held in synchronism with the transmitter terminal equipment in the manner just described, the timing circuit may be identical with that described above in connection with the transmitter. Thus a sawtooth voltage wave generator 72 feeds a series of delay devices 73—1 to 73—8, each of which introduces a delay of $t$, and from the points interconnecting which, delayed versions of the sawtooth wave may be derived and applied to the respective grids of a group of triodes 75 in the anode circuit of each of which is a pulse coil 74 similar to the coils 4 described above. The saturable core 63 of each such coil is provided with two windings, the first of which 74 is connected in the anode circuit of the tube 75, the second 77 being furnished with an adjustable bias current for setting the quiescent value of the magnetizing force as described in connection with the transmitter apparatus. In the case of all the cores except the first two, a third winding 78 is also provided, being connected in series with the third windings 78 of the other coils of this group, all as described above in connection with the transmitter apparatus. In operation, and in the absence of incoming channel pulses, the anode currents of the several tubes 75 having the wave form shown in curve A of Fig. 6 and follow one another at intervals of $t$. Each of the eight listeners A through H, inclusive, is furnished with a telephone instrument which is supplied by way of a low-pass filter 80 from a two-way clamp circuit 81. When actuated, the clamps simultaneously discharge all of a bank of storage condensers 82 into the appropriate telephone receivers of the several listeners. This is the first event to take place in the frame cycle, and is accomplished by application of a clamping pulse from coil 74—0 to all of the two-way clamps at once.

The ensuing events will be described in connection with the example already taken in which talkers B, E and F were active, the others being idle. Thus, after the pulse from coil 74—0 has discharged the speech samples from the prior frame by way of the clamps 81 to the appropriate listeners, the next event to take place is the occurrence of a pulse in coil 74—1. This is applied to a time-coincidence gate III 83—1 which may be of the same variety as gates I and II at the transmitter, for example, a pentode, the pulse from coil 74—1 being applied to its control grid while the pulses of the incoming train on the line 70 are applied to its suppressor grid or vice versa. By hypothesis, the pulse position corresponding to the No. 1 channel pulse is blank so that gate III 83—1 does not operate, and the pulse from coil 74—1 is thus of no effect. After a time $t$ thereafter, a pulse occurs in coil 74—2 which is similarly applied to the gate III 83—2. At the same instant, a channel pulse of the incoming train is applied to this gate which, like the gate 83—1, may be a pentode. The coil 74—2 pulse may be applied to one of its grids while the pulses of the incoming train are applied to the other. The coincidence of the pulses from these two sources serves to enable gate 83—2 which sends a pulse output by way of two paths. The right-hand path operates a clamp circuit 84—2 which connects a condenser 85—2 momentarily to a source of bias control voltage which may be a single trip multivibrator 86 whose output wave form is shown in curve F of Fig. 6. The bias control voltage, thus stored for the remainder of the frame period, is applied, preferably by way of a cathode feedback buffer 87—2 to the grid of a triode 88—2. The tube 88—2 is normally held below cut-off but when the above-mentioned clamp 84—2 operates, this tube 88—2 conducts a current from a battery 89. As in the case of the transmitter apparatus, the resulting current flowing through all of coils 78—3 to 78—8, inclusive, operates to delay the occurrence of the condition in which the pulses occur at the output terminals of the remaining tubes of the group 75, and so provides time for the complete decoding of the code pulse group which follows immediately upon the No. 2 channel pulse.

The decoder 90 may be of any suitable variety, a suitable one comprising a resistor-and-condenser combination 91 having a decay factor of one-half in one pulse period, to which standard magnitude increments of charge are applied by any suitable means. The operation of such a condenser resistor combination to convert binary code pulse groups into signal amplitude samples is described in the aforementioned article published in the Bell System Technical Journal. Various means may be employed to apply the required standard increments of charge to this resistor combination. For example, a synchronously rotating cathode beam may be radially deflected to pass through an aperture 92 in a mask when, and only when, an incoming pulse arrives. Such a system is shown, for example, in an application of Frank Gray and R. W. Sears, Serial No. 785,696, filed November 13, 1947. With such a decoding system, the decoded speech sample builds up at the input terminals of a clamp 93 throughout the duration of the code pulse group, and attains its correct value at the termination of the code pulse group, namely, after a time $7t$ measured from the instant of occurrence of the No. 2 channel pulse. At this instant the clamp 93—2 is actuated to connect a storage condenser 94—2 to the decoder 90, and thus to place on the storage condenser 94—2 a total charge which is proportional to the decoded speech sample. The clamp 93—2 is operated at the correct instant by a pulse in the left-hand output path from gate III 83—2 delayed by the proper time interval, namely $7t$, by a suitable delay device 95—2. Immediately it has served its purpose of placing the decoded speech sample in the form of a charge on the storage condenser 94—2, the clamp 93—2 opens, leaving the charge on the storage condenser and isolating this condenser from further decoded speech samples which, while they are present at the input terminals of the clamp 93—2 are nevertheless destined for listeners other than B.

The next events, which take place in rapid succession, are the occurrences of pulses in coils 74—3 and 74—4, separated from each other and from the recovery pulse-period of the channel 2 pulse group by $t$. This situation is illustrated in curves B and C of Fig. 6. Inasmuch as the incoming pulse train is blank at the time of occurrence of pulses from coils 74—3 and 74—4, gates 83—3 and 83—4 remain disabled and no further action takes place in the message paths for listeners C and D. The next event, after another time interval $t$ is the occurrence of the pulse of coil 74—5. This is applied to gate III 83—5 at the same instant as the No. 5 channel pulse of the incoming train. As with the other gates 83 of this group, gate 83—5 may be a pentode, the coil pulse being applied to one of its grids and the incoming channel pulse to another. The time coincidence between these two pulses enables the gate which delivers an output in the right-hand direction in the figure to the clamp 84—5 which connects the grid of the triodes 88—5, by way of a buffer 87—5 to the bias control voltage source 86 which at this instant has its most positive value, thereby enabling the triode 88—5 to conduct a current from the battery 89 by way of its discharge path, its anode resistor and the control bias windings of coils 78—6, 78—7 and 78—8. As in the case of channel 2, the magnitude of this control bias current is so adjusted as to effectively postpone the occurrence of the pulsing condition in coils 74—6, 74—7 and 74—8 by a time interval $7t$. At the same time the output of gate III 83—5 is applied by way of a delay device 95—5 which introduces a delay of $7t$ to the decoder clamp 93—5. As in the case of channel 2, the decoded speech signal will have attained its correct value at the input terminals of the clamp at the conclusion of the code pulse group period, namely, seven pulse periods after the No. 5 channel pulse. Thus the decoder clamp 93—5 is operated at the correct time for a brief instant and a charge is placed on the storage condenser 94—5 whose value is proportional to the decoded signal as it instantaneously appears at the input terminals of the clamp. Upon removal from the clamp 93—5 of the operating pulse, the signal path controlled by this clamp is immediately reopened, leaving the decoded speech sample in the form of a charge on the storage condenser 94—5 and isolating this condenser from further decoded speech samples which would be destined for hearers other than E.

The next event to occur is the pulse in coil 74—6. As before, and since talker F is active, the No. 6 channel pulse is present in the incoming train. Gate III 83—6 is therefore opened by the time coincidence of the No. 6 channel pulse and the pulse from coil 74—6. Opening of gate III 83—6 clamps the grid of triode 88—6 to the bias control voltage source 86, passes a current of appropriate value from the battery 89 through this triode, and the bias control windings 78—7 and 78—8 which effectively postpones the occurrence of the pulsing condition in the coils 74—7 and 74—8 by another interval of $7t$. At the same time the output of gate III 83—6 is applied, by way of a delay device 95—6 which introduces a delay of $7t$, to the decoder clamp 93—6 which thus operates momentarily at the termination of the code pulse group period of listener F, at which time the decoded speech sample as it appears at the input terminals of the clamp has attained the correct value. This is placed as a charge on the storage condenser 94—6 whereupon the clamp disables the signal sample path, leaving the charge on the storage condenser and isolating it from subsequent samples which may occur in the decoder output.

By hypothesis, talkers G and H are silent, so that the last two events to take place in the frame are the occurrences of pulses in coils 74—7 and 74—8. These are ineffective to open the gates III 83—7 and 83—8, because at the times at which they occur, the No. 7 and No. 8 channel pulse positions are blank in the incoming pulse train.

At the conclusion of the frame, the original magnetic conditions of all of the cores of all of the pulse coils must be restored to their original values in preparation for operations in the ensuing frame. This is carried out, in accordance with the invention, by cutting off the discharge currents of all of the tubes 88 which reduces the currents in all of the control bias windings 78 to zero. This, in turn, is accomplished by the application of the pulse output of coil 74—0 of the ensuing frame, to all of the clamps 97 in parallel, thus clamping the grids of the tubes 88 to a sufficiently negative voltage, at the conclusion of each frame. The negative voltage may conveniently be derived from the bias control voltage source 86, which during the latter portion of this frame has this negative value. In particular the bias control voltage source may be a conventional single trip multi-vibrator having a relaxation time of twenty-one pulse periods, and triggered, by way of a conductor 99, into a condition in which it delivers a voltage of suitable magnitude (flat part of curve F of Fig. 6) by the frame synchronizing pulse which arrives at the beginning of each frame. Thus, during the last few pulse positions of the frame, the voltage output of this bias source has a more negative value, and the tubes 88 are cut off by reason of the fact that their grids are clamped, by way of the buffers 87, to this more negative voltage under the action of the initial pulse of the ensuing frame, generated by the coil 74—0. This restores the magnetic conditions of all of the pulse coils 74 to their original values in which they are ready for action in the ensuing frame in the manner above described. As described earlier, the initial pulse of the ensuing frame from coil 74—0 also acts by way of the clamps 81 to discharge all of the storage condensers 94 into the telephone receivers of the several listeners for which the speech samples stored on them are destined.

It is a feature of the particular decoder apparatus employed as a component in the present system that decoded speech samples are all of the same sign, smallest values corresponding to signal peaks in one direction, largest values corresponding to signal peaks in the other direction, and average values corresponding to portions of the speech wave which are of small or zero amplitude. Now in the case of any talker who is momentarily inactive or, if he is active, his speech sample is not transmitted because it is smaller than the threshold of the sample detector 24, the corresponding storage condenser 94 receives no charge from the decoder 90 by way of the clamp 93, and when the stored charge is discharged into the listener's telephone instrument, the resulting speech sample as applied to this telephone instrument constitutes false information, since the correct information is that which corresponds to the central part of the transmitter coding mask 50. To remedy this defect, steps must be taken to arrange that zero values of the recovered speech wave correspond, at the receiver as they do at the transmitter, to average values of the charge on the storage condenser 94 during a talkspurt. Channels which are not transmitted because they are momentarily inactive must be made to contribute this average condenser charge, to avoid violent transient disturbances. This is accomplished by insuring that all of the storage condensers 94 shall have, at the beginning of each frame, a charge equal to the average output of the decoder 90. This result is secured by discharging each storage condenser 94 at the end of the frame not directly into the hearer's telephone receiver but by way of a battery 100 whose voltage is the average of the stored voltages.

At the end of a frame in which any particular channel has been found inactive by its sample detector 24, this correct voltage is discharged into the listener's receiver since it has been held on the storage condenser 94 throughout that frame. In the case of a channel which is active, the channel pulse acts by way of the clamp 83 and a discharge clamp 101 to discharge the particular condenser 94 to ground, thus removing all charge from that condenser prior to the instant at which the output of the decoder 90 is stored on it. In order to provide approximately equal times for charging and for discharging the storage condensers 94, each of the channel pulses, as it arrives from the associated gate III 83, is first passed through a delay device 102 which delays it approximately $3t$, and is then applied to the associated condenser discharge clamp 101. This instantaneously grounds the condenser 94 and removes all charge from it, so that the charge increment later placed upon it by operation of the decoder clamp 93 shall be measured from zero. Thereafter, when the time arrives for discharging the condenser 94 into the listener's telephone instrument, this discharge takes place by way of the battery 100 whose voltage is equal to the average value of the decoder output as it appears on the storage condensers 94. When the storage condenser 94 has a charge equal to its average value, this is exactly balanced by the voltage of the battery, so that when the clamp 93 is instantaneously closed by the delayed output of the gate III 83 on the occurrence of the channel pulse, a speech sample of zero magnitude is delivered to the listener.

The impulse coils and cores employed in the present system may be of the type described in the following publications: "Magnetic Generation of a Group of Harmonics" by E. Peterson, J. M. Manley and L. R. Wrathall, Bell System Technical Journal, October, 1937, volume 16, page 437; "Coil Pulsers for Radar" by E. Peterson, Bell System Technical Journal, October, 1946, volume 25, page 603; "Frequency Modulation by Non-Linear Coils" by L. R. Wrathall, Bell Laboratories Record, March, 1946, volume 24, page 102. The various clamps employed in the present system may be as described and shown in an article entitled "An Experimental Multichannel Pulse Code Modulation System of Toll Quality" by L. A. Meacham and E. Peterson, Bell System Technical Journal, January, 1948, volume 27, page 1 and especially pages 26 and 27.

The tuned speech detector may be of the type shown in Bjornson Patent 1,840,015.

What is claimed is:

1. In an elastic time division multiplex transmission system wherein speech samples of the instantaneously active members of a group of callers are transmitted in sequence over channel facilities which are fewer in number than the number of members of the group, a number of incoming lines at a transmitter terminal, one for each caller, a number of saturable cores, one for each caller, a first winding on each core, means for applying a saw-tooth current wave to the first windings of the several cores in succession to derive a series of control voltage pulses, means for utilizing said control voltage pulses to test said incoming lines in serial order for activity, a second winding on the core assigned to each caller having a serial number higher than the first, means controlled by the activity of any caller for passing a bias control current of standard magnitude through the second windings of all cores assigned to callers having serial numbers higher than that of said active caller in a direction to delay, by a preassigned time interval, the derivation of the control voltages from the first windings of all of said last-named callers, and means for transmitting the speech sample of said active caller during said time interval.

2. In an elastic time division multiplex transmission system wherein speech samples of the instantaneously active members of a group of callers are transmitted in sequence over channel facilities which are fewer in number than the number of members of the group, a number of incoming lines at a transmitter terminal, one for each caller, a number of saturable cores, one for each caller, a first winding on each core, means for applying a saw-tooth current wave to the first windings of the several cores in succession to derive a series of control voltage pulses, means for utilizing said control voltage pulses to test said incoming lines in serial order for activity, a second winding on the core assigned to each caller having a serial number higher than the first, means controlled by the activity of any caller for passing a bias control current of standard magnitude through the second windings of all cores assigned to callers having serial numbers higher than that of said active caller, in a direction to delay, by a preassigned time interval, the derivation of the control voltages from the first windings of all of said last-named callers, means for encoding and transmitting the speech sample of said active caller during said time interval, and means for also transmitting within said time interval a signal indicative of the activity of said caller.

3. In an elastic time division multiplex transmission system wherein speech samples of the instanstaneously active members of a group of callers are transmitted in sequence over channel facilities which are fewer in number than the number of members of the group, a number of incoming lines at a transmitter terminal, one for each caller, means for generating a voltage wave of saw-tooth form, a string of delay devices, means for applying said voltage to said string, whereby delayed replicas of said voltage appear at the terminals of the several devices in sequence, means for converting each of said delayed replicas into a current of like form, a number of saturable cores, one for each caller, a first winding on each core, means for applying one of said replica current waves to the first winding of each of said cores to derive a series of control voltage pulses, means for utilizing said control voltage pulses to test said incoming lines in serial order for activity, a second winding on the core assigned to each caller having a serial number higher than the first, means controlled by the activity of any caller for passing a bias control current of standard magnitude through the second windings of all cores assigned to callers having serial numbers higher than that of said active caller, in a direction to delay, by a preassigned time interval, the derivation of the control voltages from the first windings of all of said last-named callers, and means for transmitting the speech sample of said active caller during said time interval.

4. In an elastic time division multiplex transmission system wherein speech samples of the instantaneously active members of a group of callers are transmitted in sequence over channel facilities which are fewer in number than the number of members of the group, a number of incoming lines at a transmitter terminal, one for each caller, means for generating a voltage wave of sawtooth form, said wave comprising, in each full cycle of $N+n+nd+1$ pulse periods, where N is the total number of callers,
$n$ is the number of active callers provided for,
$d$ is the number of digits in the code, a first linearly rising portion of at least $(n-1)(d+1)$ pulse periods, a second transitional falling portion of at most $d+2$ pulse periods, and a third, substantially flat slightly negative portion of at least N pulse periods, a string of delay devices, means for applying said voltage to said string, whereby delayed replicas of said voltage appear at the terminals of the several delay devices in sequence, means for converting each of said delayed replicas into a current of like form, a number of saturable cores, one for each caller, a first winding on each core, means for applying a saw-tooth current wave to the first windings of the several cores in succession to derive a series of control voltage pulses, means for utilizing said control voltage pulses to test said incoming lines in serial order for activity, a second winding on the core assigned to each caller having a serial number higher than the first, means controlled by the activity of any caller for passing a bias control current of standard magnitude through the second windings of all cores assigned to callers having serial numbers higher than that of said active caller in a direction to delay by a time interval of $(d+1)$ pulse periods the derivation of the control voltages from the first windings of all of said last-named callers, means for converting the speech sample of said active caller into a code pulse group of $d$ digits during said time interval, and means for transmitting, within said time interval, said code pulse group and a signal indicative of the activity of said caller.

5. In an elastic time division multiplex transmission system wherein speech samples of the instantaneously active members of a group of callers at a transmitter terminal are transmitted in sequence over channel facilities which are fewer in number than the number of members of the group, apparatus at a receiver station adapted to receive successive code pulse groups destined for different listeners, each such code pulse group being preceded by a channel pulse indicative of the instantaneous activity of a particular caller, a number of saturable cores, one for each listener, a first winding on each core, means for applying a saw-tooth current wave to the first windings of the several cores in succession to derive a series of control voltage pulses, means for utilizing each of said control voltage pulses to test said incoming code pulse train for the presence of a channel pulse, a second winding on the core assigned to each listener having a serial number higher than the first, means controlled by the time coincidence of an incoming channel pulse with a control voltage pulse of said series for passing a bias control current of standard magnitude through the second windings of all cores assigned to listeners having serial numbers higher than that of said active caller in a direction to delay, for a preassigned time interval, the derivation of the control voltages derived from the first windings of all of said last-named listeners, and means for decoding the code pulse group which follows said channel pulse and converting it into a speech sample during said time interval.

6. In an elastic time division multiplex transmission system wherein speech samples of the instantaneously active members of a group of callers at a transmitter terminal are transmitted in sequence over channel facilities which are fewer in number than the number of members of the group, apparatus at a receiver station, adapted to receive successive code pulse groups destined for different listeners, each group being preceded by a channel pulse indicative of the instantaneous activity of a particular caller, means for generating a voltage wave of saw-tooth form, a string of delay devices, means for applying said voltage to said string, whereby delayed replicas of said voltage appear at the terminals of the several delay devices in sequence, means for converting each of said delayed replicas into a current wave of like form, a number of saturable cores, one for each listener, a first winding on each core, means for applying one of said replica current waves to the first winding of each of said cores in succession to derive a series of control voltage pulses, means for utilizing said control voltage pulses to test said incoming code pulse train for the presence of a channel pulse, a second winding on the core assigned to each listener having a serial number higher than the first, means controlled by the time coincidence of an incoming channel pulse with a control voltage pulse of said series for passing a bias control current of standard magnitude through the second windings of all cores assigned to listeners having serial numbers higher than that of said active caller in a direction to delay, for a preassigned time interval, the derivation of the control voltages derived from the first windings of all of said last-named listeners, and means for decoding the code pulse group which follows said channel pulse and converting it into a speech sample during said time interval.

7. In an elastic time division multiplex transmission system wherein speech samples of the instantaneously active members of a group of callers at a transmitter terminal are transmitted in sequence over channel facilities which are fewer in number than the number of members of the group, apparatus at a receiver station adapted to receive successive code pulse groups destined for different listeners, each such code pulse group being preceded by a channel pulse indicative of the instantaneous activity of a particular caller, a number of saturable cores, one for each listener, a first winding on each core, means for applying a saw-tooth current wave to the first windings of the several cores in succession to derive a series of control voltage pulses, means for utilizing each of said control voltage pulses to test said incoming code pulse train for the presence of a channel pulse, a second winding on the core assigned to each listener having a serial number higher than the first, means controlled by the time coincidence of an incoming channel pulse with a control voltage pulse of said series for passing a bias control current of standard magnitude through the second windings of all cores assigned to listeners having serial numbers higher than that of said active caller in a direction to delay, for a preassigned time interval, the derivation of the control voltages derived from the first windings of all of said last-named listeners, means for decoding the code pulse group which follows said channel pulse and converting it into a speech sample during said time interval, a storage device and a reproducer assigned to each listener, means for storing the several speech samples so recovered on the several storage devices, and means for discharging the several storage devices individually into the several reproducers at the conclusion of each full cycle of operations.

8. In an elastic time division multiplex transmission system wherein speech samples of the instantaneously active members of a group of callers at a transmitter terminal are transmitted in sequence over channel facilities which are fewer in number than the number of members of the group, apparatus at a receiver station adapted to receive successive code pulse groups destined for different listeners, each group being preceded by a channel pulse indicative of the instantaneous activity of a particular caller, means for generating a voltage wave of sawtooth form, said wave comprising, in each full cycle of $N+n+nd+1$ pulse periods, where N is the total number of callers,
$n$ is the number of active callers provided for,
$d$ is the number of digits in the code, a first linearly rising portion of at least $(n-1)(d+1)$ pulse periods, a second transitional falling portion of at most $d+2$ pulse periods, and a third, substantially flat slightly negative portion of at least N pulse periods, a string of delay devices, means for applying said voltage to said string, whereby delayed replicas of said voltage appear at the terminals of the several delay devices in sequence, means for converting each of said delayed replicas into a current of like form, a number of saturable cores, one for each listener, a first winding on each core, means for applying a saw-tooth current wave to the first windings of the several cores in succession to derive a series of control voltage pulses, means for utilizing said control voltage pulses to test said incoming code pulse train for the presence of a channel pulse, a second winding on the core assigned to each listener having a serial number higher than the first, means controlled by the time coincidence of an incoming channel pulse with a control voltage pulse of said series for passing a bias control current of standard magnitude through the second windings of all cores assigned to listeners having serial numbers higher than that of said active caller in a direction to delay, for a preassigned time interval, the derivation of the control voltages derived from the first windings of all of said last-named listeners, and means for decoding the code pulse group which follows said channel pulse and converting it into a speech sample during said time interval.

CARL B. H. FELDMAN.

(References on following page)

REFERENCES CITED

The following references are of record in the file of this patent:

UNITED STATES PATENTS

| Number | Name | Date |
|---|---|---|
| 1,873,785 | Ranger | Aug. 23, 1932 |
| 1,873,786 | Ranger | Aug. 23, 1932 |
| 1,905,359 | Affel | Apr. 25, 1933 |
| 2,200,559 | Mitchell | May 14, 1940 |
| 2,271,000 | Lovell | Jan. 27, 1942 |
| 2,277,192 | Wilson | Mar. 24, 1942 |
| 2,301,223 | Mitchell | Nov. 10, 1942 |
| 2,388,001 | Loughren | Oct. 30, 1945 |
| 2,447,233 | Chatterjea | Aug. 17, 1948 |
| 2,458,652 | Sears | Jan. 11, 1949 |
| 2,473,691 | Meacham | June 21, 1949 |

OTHER REFERENCES

"Pulse Count Modulation System," Teletech, September 1947, pp. 48–52.